(12) United States Patent
Bar-Caspi et al.

(10) Patent No.: US 8,549,138 B2
(45) Date of Patent: Oct. 1, 2013

(54) WEB TEST GENERATION

(75) Inventors: Doron Bar-Caspi, Redmond, WA (US); Kai Zhu, Beijing (CN); Daniel K. Winter, Monroe, WA (US); Demetrios Kalligerakis, Sammamish, WA (US); Kfir Ami-Ad, Remond, WA (US); Yi Sui, Beijing (CN); Wenyu Cai, Redmond, WA (US); Michael Anthony Wise, Langen (DE)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 12/895,873

(22) Filed: Oct. 1, 2010

(65) Prior Publication Data

US 2012/0084433 A1    Apr. 5, 2012

(51) Int. Cl.
G06F 15/16        (2006.01)
G06F 15/173       (2006.01)

(52) U.S. Cl.
USPC ............................ 709/224; 709/219; 709/236

(58) Field of Classification Search
USPC ........................................................ 709/224
See application file for complete search history.

(56) References Cited

U.S. PATENT DOCUMENTS

| | | | | |
|---|---|---|---|---|
| 5,303,166 A | * | 4/1994 | Amalfitano et al. | 702/186 |
| 5,812,780 A | * | 9/1998 | Chen et al. | 709/224 |
| 5,950,196 A | * | 9/1999 | Pyreddy et al. | 715/227 |
| 5,974,572 A | * | 10/1999 | Weinberg et al. | 714/47.2 |
| 6,418,544 B1 | | 7/2002 | Nesbitt et al. | |
| 6,434,513 B1 | * | 8/2002 | Sherman et al. | 702/186 |
| 6,549,944 B1 | * | 4/2003 | Weinberg et al. | 709/224 |
| 6,721,686 B2 | | 4/2004 | Malmskog et al. | |
| 6,889,158 B2 | * | 5/2005 | Penov et al. | 702/119 |
| 7,031,981 B1 | * | 4/2006 | DeLuca et al. | 1/1 |
| 7,047,446 B1 | * | 5/2006 | Maurer et al. | 714/38.1 |
| 7,111,204 B1 | | 9/2006 | Couturier et al. | |
| 7,231,606 B2 | | 6/2007 | Miller et al. | |
| 7,516,042 B2 | * | 4/2009 | Glas et al. | 702/182 |
| 7,526,680 B2 | | 4/2009 | Mathew et al. | |
| 7,614,042 B1 | * | 11/2009 | Hardy et al. | 717/124 |
| 7,630,862 B2 | | 12/2009 | Glas et al. | |
| 7,676,574 B2 | | 3/2010 | Glommen et al. | |
| 7,822,850 B1 | * | 10/2010 | Brikman et al. | 709/224 |
| 2002/0032564 A1 | * | 3/2002 | Ehsani et al. | 704/235 |
| 2002/0042821 A1 | | 4/2002 | Muret et al. | |
| 2002/0188586 A1 | * | 12/2002 | Veale | 707/1 |
| 2003/0005044 A1 | * | 1/2003 | Miller et al. | 709/203 |

(Continued)

OTHER PUBLICATIONS

Chatterjee, Amit, "Web and Load Testing with Visual Studio Team System", Retrieved at <<http://blogs.msdn.com/amit_chatterjee/archive/2009/01/29/web-and-load-testing-with-visual-studio-team-system.aspx>>, Jan. 29, 2009, pp. 19.

(Continued)

*Primary Examiner* — Melvin H Pollack
(74) *Attorney, Agent, or Firm* — Hope Baldauff, LLC

(57) ABSTRACT

Technologies are described herein for generating a suite of web tests that are then combined into a load test. A log file is received. The log file may contain one or more requests received at a web server. Relevant information is extracted from the log file into a data file. A web test template is retrieved. The web test template is populated with the relevant information from the data file to generate the web test.

17 Claims, 7 Drawing Sheets

(56) References Cited

U.S. PATENT DOCUMENTS

| | | | |
|---|---|---|---|
| 2003/0182408 A1* | 9/2003 | Hu | 709/223 |
| 2004/0049701 A1 | 3/2004 | Le Pennec et al. | |
| 2004/0199815 A1* | 10/2004 | Dinker et al. | 714/21 |
| 2004/0254919 A1* | 12/2004 | Giuseppini | 707/3 |
| 2006/0136493 A1 | 6/2006 | Muralidharan et al. | |
| 2007/0192190 A1 | 8/2007 | Granville | |
| 2007/0198621 A1* | 8/2007 | Lumsdaine et al. | 708/200 |
| 2009/0119062 A1 | 5/2009 | Owens et al. | |
| 2009/0157574 A1 | 6/2009 | Lee | |
| 2009/0265689 A1* | 10/2009 | Gooi et al. | 717/125 |
| 2010/0030894 A1 | 2/2010 | Cancel et al. | |
| 2010/0049847 A1 | 2/2010 | Muret et al. | |
| 2011/0202483 A1 | 8/2011 | Bergman et al. | |

OTHER PUBLICATIONS

"LoadRunner Architecture", Retrieved at <<http://www.wilsonmar.com/1loadrun.htm>>, Nov. 28, 2007, pp. 22.

Mirrell, L. Christopher, "Load Testing an AJAX Application", Retrieved at <<http://www.webperformanceinc.com/library/reports/AjaxLoadTesting>>, Version 1.1, Jul. 17, 2007, pp. 9.

Strahl, Rick, "Load Testing Web Applications using Microsoft's Web Application Stress Tool", Retrieved at <<http://www.west-wind.com/presentations/webstress/webstress.htm>>, Feb. 24, 2000, pp. 12.

"Stress Testing with Microsoft Web Capacity Analysis Tool (WCAT)", Retrieved at <<http://www.galcho.com/articles/StressTestingWCAT.aspx>>, retrieved date Apr. 30, 2010, pp. 8.

U.S. Official Action dated Aug. 7, 2012 in U.S. Appl. No. 12/891,826.

U.S. Official Action dated Nov. 23, 2012 in U.S. Appl. No. 12/891,826.

"Assessing Web Site Usability from Server Log Files," Dec. 1999, Retrieved at http://www.leced.com/PDFs/whitepap.pdf, 16 pp.

"Comprehensive Web Page Counter—Log File Analysis Software," Retrieved Mar. 18, 2010 at http://www.maximized.com/ products/flashstats/, 5 pp.

"What is AlterWind Log Analyzer?," Retrieved Mar. 18, 2010 at http://www.alterwind.com/loganalyzer/, 1 pp.

Gousset, "Data Driven Web Testing with Visual Studio 2008 Team System," Dec. 18, 2007, Retrieved at http://www.codeprojecl.com/KB/aspneI/VS08DataDrivenWebTests.aspx, 9 pp.

Lanzi et al., "A Framework for Exploiting Conceptual Modeling in the Evaluation of Web Application," Retrieved Mar. 18, 2010 at http://www.webml.org/webml/upload/ent5/1ILanzielAl.pdf, 5 pp.

* cited by examiner

```
                                                                              300
              ╭─302                                                          ╱
<MatchRule Name="Match_ASPX_SiteHomePage">
    <MatchCondition>
        <FieldCondition Field="cs-uri-stem" Predicate="EndsWith"> ⎫
            <Value>/default.aspx</Value>                           ⎬ 304
        </FieldCondition>                                          ⎭
        <FieldCondition Field="cs-uri-stem" Predicate="NotContains"> ⎫
            <Value>/pages/</Value>                                   ⎬ 306
        </FieldCondition>                                            ⎭
        <FieldCondition Field="cs-method" Predicate="Equals" > ⎫
            <Value>GET</Value>                                  ⎬ 308
        </FieldCondition>                                       ⎭
    </MatchCondition>
</MatchRule>
```

*Fig. 3A*

```
                                                                              320
              ╭─322                                                          ╱
<WebTest Name="ASPX_SiteHomePage">
    <CsvFiles>
        <CsvFile Name="sites" CsvTemplate="site">
            <DataSources>        ╭─324
  ╭─326       <DataSource MatchRuleRef="Match_ASPX_SiteHomePage"
ExtractionRuleRef="Extract_Dirname_From_DefaultPage"/>
            </DataSources>
        </CsvFile>
    </CsvFiles>
    <TestMixMeasurements>
        <TestMixMeasurement MatchRuleRef="Match_ASPX_SiteHomePage"/>
    </TestMixMeasurements>
    <Users>
        <User Permission="FullRead" />
        <User Permission="FullControlWithoutAdmin" />
    </Users>
</WebTest>
```

*Fig. 3B*

WEB TEST GENERATION

CROSS-REFERENCE TO RELATED APPLICATIONS

This application is related to U.S. patent application Ser. No. 12/891,826, filed Sep. 28, 2010, and entitled, "WEB TRAFFIC ANALYSIS TOOL," which is hereby incorporated by reference in its entirety.

BACKGROUND

Generally, web servers are configured to handle transactions, such as Hypertext Transfer Protocol ("HTTP") transactions and File Transfer Protocol ("FTP") transactions, for accessing online content. Web servers may receive requests from one or more client computers over a computer network, such as the Internet. In response to those requests, the web servers may provide the requested websites to the client computers. For example, a user may access a web browser executing on a personal computer and enter a particular Universal Resource Locator ("URL"). The web server may then direct to the user to a particular web page corresponding to the URL. In particular, the web page may load Hypertext Markup Language ("HTML"), which may cause the web page to further load Cascading Style Sheets ("CSS"), JavaScript, and/or images.

While a web server is typically designed to handle actual transactions over a network, a web server administrator may also operate the web server in a controlled testing environment. In particular, the web server administrator may employ various web server tests in order to analyze the load and/or performance of the web server. In one example, the web server administrator may upgrade web server software running on the web server. Prior to placing the upgraded server software in operation on the network, the web server administrator may simulate a standard load of the web server against the upgraded web server software. In another example, the web server administrator may simulate additional load on the web server in order to analyze the performance and stress of the web server when handling the additional load. The web server administrator can then utilize the results of this performance and stress testing to decide whether to upgrade the web server equipment.

In order to properly simulate potential loads of the web server, the web server administrator may generate synthetic loads that mimic actual loads that the web server might handle in a real world setting. However, web server tests may utilize predefined synthetic loads that may not be applicable for every web server. Further, manually generating such synthetic loads can be unduly time-consuming and burdensome for the web server administrator.

It is with respect to these considerations and others that the disclosure made herein is presented.

SUMMARY

Technologies are described herein for generating a suite of web tests that are then combined into a load test. Through the utilization of the technologies and concepts presented herein, a web test generation tool may extract relevant information from a web server log, which contains transactions handled by a given web server. The web test generation tool may then populate a web test template with the extracted information, thereby generating a web test. A synthetic load can be formed by combining one or more generated web tests. Since the web tests are generated based on real world transactions recorded on the web server log, the synthetic load may properly mimic an actual load handled by the web server.

In an example technology, a computer having a memory and a processor is configured to generate a web test. The computer receives a log file. The log file may contain one or more requests received at a web server. The computer extracts relevant information from the log file into a data file. The computer retrieves a web test template. The computer populates the web test template with the relevant information from the data file to generate the web test.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A shows an illustrative implementation of a match rule, in accordance with some embodiments;

FIG. 3B shows an illustrative implementation of a web test definition, in accordance with some embodiments;

DETAILED DESCRIPTION

Figure 1:
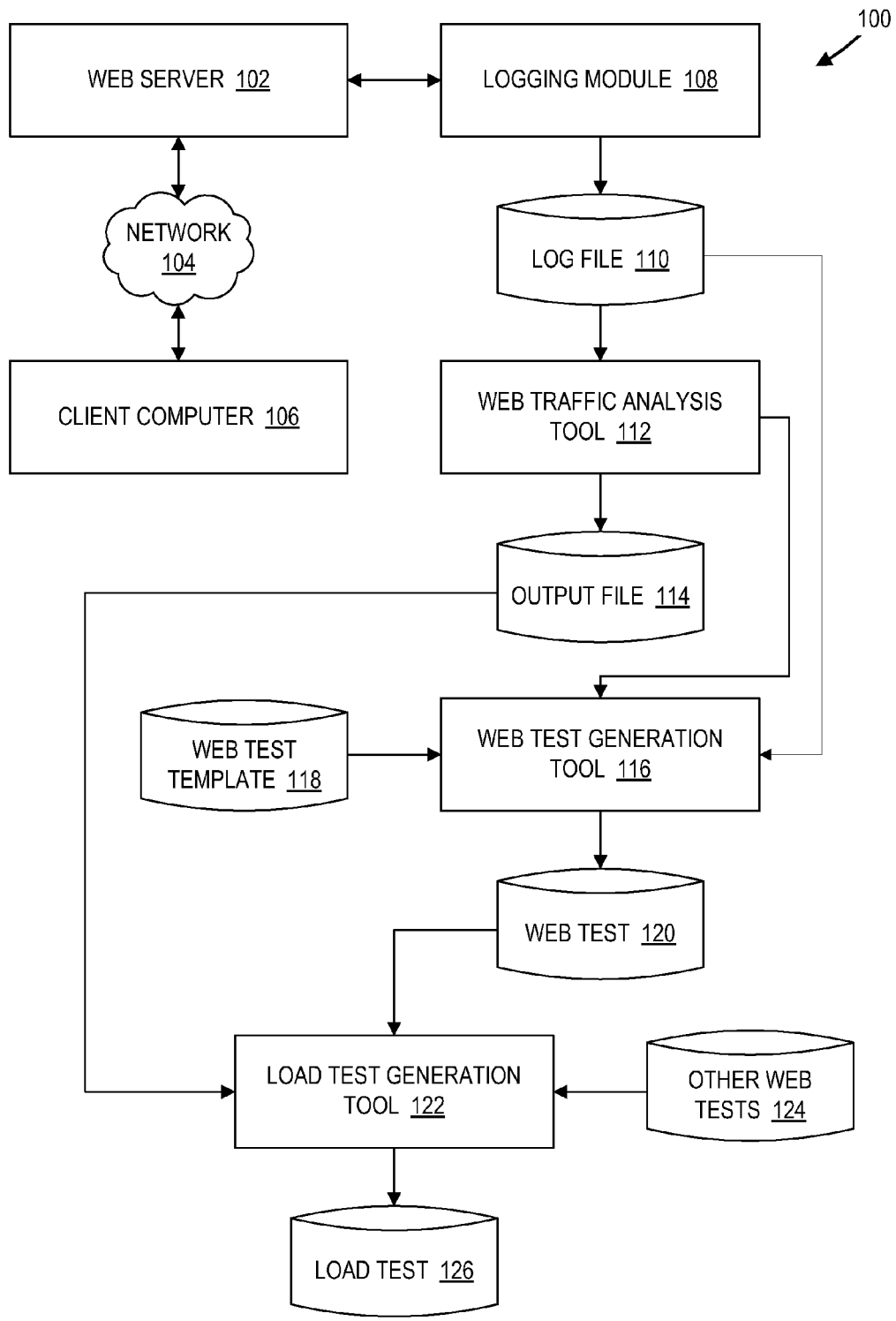
FIG. 1 is a data flow diagram illustrating a data flow for generating a synthetic load, in accordance with some embodiments.

The following detailed description is directed to technologies for generating a web test. In accordance with some embodiments described herein, a web test generation tool may extract relevant information from a web server log. A logging module may generate the web server log by monitoring transactions handled by a web server. The web test generation tool may then populate a web test template with the extracted information. A load test generation tool may generate a synthetic load (referred to herein as a "load test") by combining one or more web tests.

As used herein, a "web test" may refer to a file that includes a series of web server (e.g., Hypertext Transfer Protocol ("HTTP")) requests. The web test may be embodied in a declarative Extensible Markup Language ("XML") file or other suitable file format adapted to specify web server requests. In some embodiments, each web test may contain a single web server request. In some other embodiments, each web test may contain two more web server requests.

Each web test may contain a static component and/or a dynamic component. The static component may refer to predefined information contained in the web test. For example, the static component may be contained in a web test template. The dynamic component may refer to information that is provided by the web test generation tool when the web test is created (i.e., when the web test generation tool populates the web test template with extracted information from the web server log to generate the web test).

As used herein, a "load test" may refer to a file that includes one or more web tests. The load test may aggregate multiple web tests in order to simulate a real world load on a web server. The load test may also be embodied in a declarative XML file or other suitable file format adapted to specify one or more web tests to be executed by the web server. In addition to specifying the web tests to be executed, the load test may also specify percentages in which each web test is executed, a number of users accessing the web server, and other relevant parameters with respect to simulating the real world load. The load test may be executed against the web server in order to test, for example, response times of the web server.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for generating a web test will be described. In particular, FIG. 1 illustrates a data flow 100 for generating a synthetic load, in accordance with some embodiments. In the data flow 100, a web server 102 may handle transactions over a network 104. The transactions may include, for example, requests for web sites, web-based applications, files, and/or other online content received from client computers, such as a client computer 106, over the network 104. The network 104 may be any suitable computer network, such as a local area network ("LAN"), a personal area network ("PAN"), or the Internet.

While the web server 102 is handling transactions, such as receiving and responding to requests, a logging module 108 may record these transactions in a log file 110. An example format for the log file 110 is the W3C extended log file format. Other suitable formats may include publicly available formats as well as proprietary formats. The log file 110 may include a plurality of lines corresponding to a plurality of requests. In one embodiment, each request in the log file 110 may be embodied in a single line. Thus, if the log file 110 includes a thousand requests, then the log file 110 may include a thousand lines, each of which corresponds to one of the requests. The lines may be separated by a carriage return ("CR"), a carriage return line feed ("CRLF"), or the like. The log file 110 may be a text file, a comma-separated values ("CSV") file, a binary file, or other suitable file type.

The lines may correspond to one or more fields. In particular, each line may contain one or more values, each of which corresponds to one of the fields. The fields may correspond to a particular attribute of the corresponding request. The values may include numerical values and/or strings. Each value may be separated by whitespace or other suitable separating indicator. Some of the lines may not contain values for one or more of the fields. For example, some lines may contain null values in such fields.

In an illustrative example, the W3C extended log file format may include one or more of the following fields: date, time, service name, server Internet Protocol ("IP") address, method, Uniform Resource Identifier ("URI") stem, URI query, server port, user name, client IP address, user agent, protocol status, protocol substatus, and WIN32 status. Other suitable fields may be similarly implemented. The date field (commonly labeled "date") may specify a date of the request. The time field (commonly labeled "time") may specify time of the request. The service name field (commonly labeled "s-sitename") may specify an Internet service and instance number accessed by the client computer 106. The server IP address field (commonly labeled "s-ip") may specify the IP address of the web server 102 through which the log file 110 is generated.

The method field (commonly labeled "cs-method") may specify an action that the client computer 106 is requesting. Examples of such actions may include GET operations, LOCK operations, PROPFIND operations, POST operations, HEAD operations, and the like. The URI stem field (commonly labeled "cs-uri-stem") may specify a resource (e.g., default.aspx, index.htm, etc.) that is requested. The URI query field (commonly labeled "cs-uri-query") may specify a query, if any, requested by the client computer 106. The server port field (commonly labeled "s-port") may specify a port number to which the client computer 106 is connected. The user name field (commonly labeled "cs-username") may specify a name of an authenticated user transmitting the request. The client IP address field (commonly labeled "c-ip") may specify the IP address of the client computer 106 transmitting the request. The user agent field (commonly labeled "cs(User-Agent)") may specify a type of web browser transmitting the request from the client computer 106.

The protocol status field (commonly labeled "sc-status") may specify a status of the action identified in the method field. The status may correspond to HTTP and/or FTP status codes. For example, the HTTP status code "401" may indicate failure of the request, and the HTTP status code "200" may indicate success of the request. The protocol substatus field (commonly labeled "sc-substatus") may further specify a substatus when the status identified in the protocol status field is an error code. For example, while the HTTP status code "401" generally indicates failure of the request, a corresponding substatus value of "1" may further indicate that the failure of the request was due to a logon failure. When the status identified in the protocol status field is not an error code, the substatus value may be "0". The WIN32 status field (commonly labeled "sc-win32-status") may specify a status, in terms of MICROSOFT WINDOWS, of the action identified in the method field. For example, the WIN32 status may be utilized in log files generated by MICROSOFT INTERNET INFORMATION SERVICES.

When the logging module 108 generates the log file 110, the logging module 108 may provide the log file 110 to a web traffic analysis tool 112. The web traffic analysis tool 112 may be configured to analyze the log file 110 in order to determine the occurrence and frequency of various requests. For example, the web traffic analysis tool 112 may evaluate each line in the log file 110 and identify a type of request associated with the line. Upon analyzing the log file 110, the web traffic analysis tool 112 may generate an output file 114. The output file 114 may associate counts and/or ratios, such as percentages, for each type of request that has been identified in relation to a total number of requests received at the web server 102. The output file 114 may be a text file, a CSV file, a binary file, or other suitable file type.

Some example implementations of the web traffic analysis tool 112 are described in the above-referenced and incorporated U.S. patent application entitled "WEB TRAFFIC ANALYSIS TOOL". For example, the web traffic analysis tool 112 may utilize a match rules file (not shown) that contains a sequence of match rules, each of which identifies a type of request for each line in the log file 110. Each match rule may identify the type of request based on values of one or more attributes contained in each line. For each line in the log file 110, the web traffic analysis tool 112 may sequentially apply each match rule in the sequence of match rules according to a specified order. When the web traffic analysis tool 112 reaches a match rule that matches a given line, the web traffic analysis tool 112 may identify the line with the type of request corresponding to the match rule and disregard the remainder of the match rules in the sequence of match rules. Until the web traffic analysis tool 112 reaches a rule that matches the line, the web traffic analysis tool 112 may continue to apply additional match rules in the sequence of match rules according to the specified order.

When the logging module 108 generates the log file 110, the logging module 108 may also provide the log file 110 to a web test generation tool 116. The web test generation tool 116 may be triggered when a particular match rule satisfies a given line of the log file 110. When the web test generation tool 116 is triggered, the web test generation tool 116 may retrieve a web test template 118. The web test template 118 may contain a static component and a dynamic component related to a web test. The static component may include one or more predefined values that are the same for each web test generated based on the web test template 118. The dynamic component may contain empty variables whose values are determined by the web test generation tool 116. In particular, the web test generation tool 116 may populate the empty variables with relevant information retrieved from the log file 110 in order to generate a web test 120. The operation of the web test generation tool 116 is described in greater detail below in accordance with various embodiments.

When the web test generation tool 116 generates the web test 120, the web test generation tool 116 may provide the web test 120 to a load test generation tool 122. The load test generation tool 122 may combine the web test 120 and other previously generated web tests 124 in order to generate a load test 126. In addition to specifying the web tests 120, 124, the load test 126 may also specify various parameters for executing the web tests 120, 124. For example, these parameters may include counts and/or percentages in which each of the web tests 120, 124 should be executed and the number of users accessing the web server 102. The output file 114 may provide at least a portion of these parameters. The load test 126 may be executed against the web server 102 to simulate a real world load.

Figure 2:
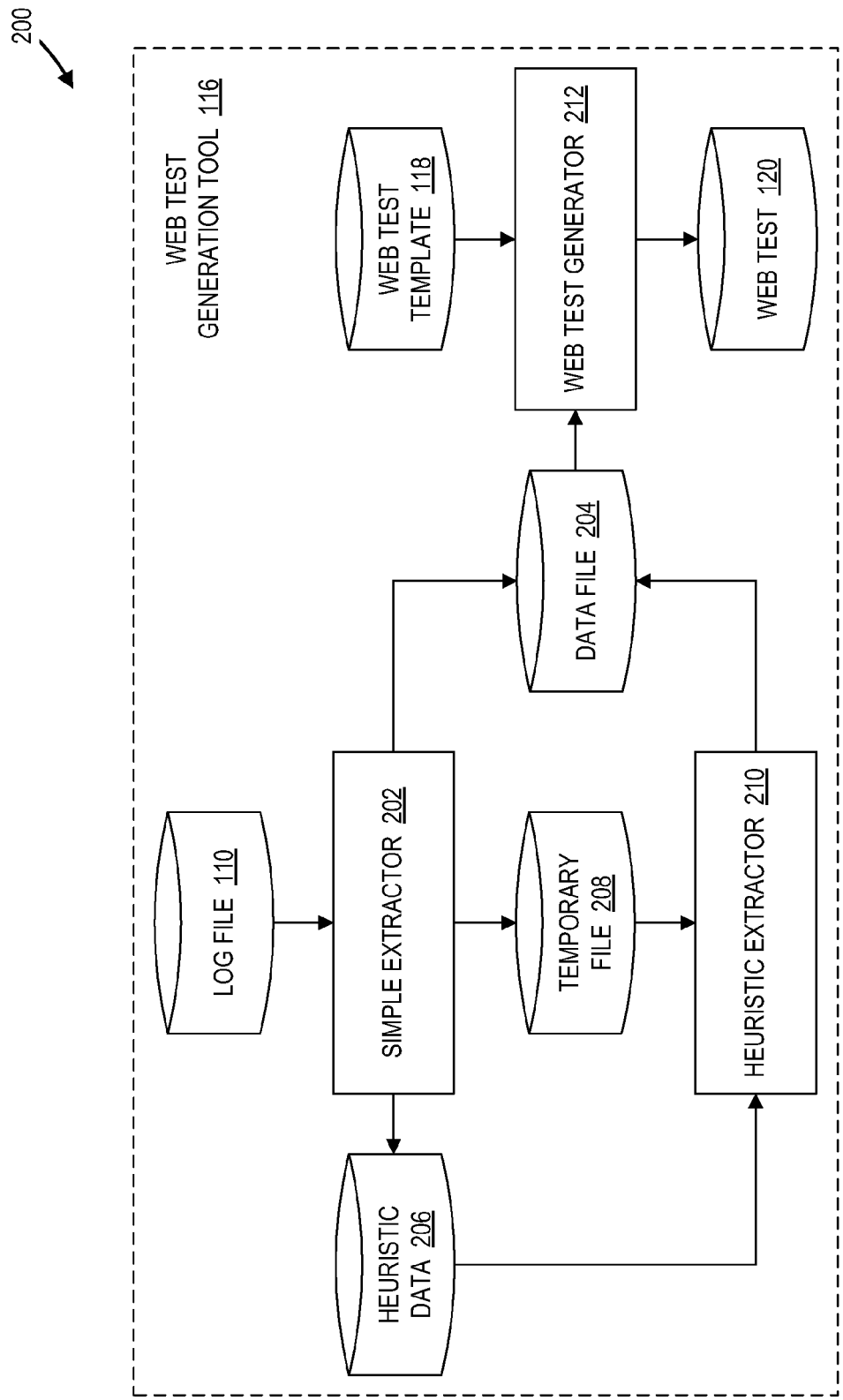
FIG. 2 is a data flow diagram illustrating a data flow for generating a web test, in accordance with some embodiments.

Referring now to FIG. 2, additional details regarding the operation of the web test generation tool 116 will be provided according to various embodiments. In particular, FIG. 2 illustrates a data flow 200 for generating the web test 120, in accordance with some embodiments. In the data flow 200, a simple extractor 202 may be configured to receive the log file 110, extract relevant information from the log file 110, and output the relevant information to a data file 204. This relevant information may be deemed "relevant" because it is utilized to generate the web test 120. Examples of relevant information may include URLs, user information, file information, and the like. In particular, the simple extractor 202 may be configured to extract a portion of the log file 110. For example, the simple extractor 202 may extract a directory name (e.g., dirname) from a URL (e.g., /dirname/_layouts/viewlsts.aspx) in the log file 110. In addition to generating the data file 204, the simple extractor 202 may also generate heuristic data 206. The heuristic data 206 may be generated based, at least in part, on the extracted relevant information in the data file 204.

In some instances, the simple extractor 202 may not be able to extract the relevant information. In particular, a line in the log file 110 may contain an ambiguity that prevents the simple extractor 202 from distinguishing between different information. For example, the simple extractor 202 may be unable to distinguish between directory names (e.g., dirname1, dirname2) and a document library name (e.g., doclib) within a URL (e.g., /dirname1/dirname2/doclib/folder1/folder2/mydocument1.docx). In such cases, the simple extractor 202 may output ambiguous lines of the log file 110 to a temporary file 208. The simple extractor 202 may then provide the temporary file 208 to a heuristic extractor 210.

The heuristic extractor 210 may extract the relevant information from the temporary file 208 and output the relevant information to the data file 204. The heuristic extractor 210 may utilize the heuristic data 206 generated by the simple extractor 202 in order to resolve any ambiguities within the temporary file 208. In an illustrative example, a given URL in the temporary file 208 may contain ambiguities that prevent the simple extractor 202 from determining where a directory name (e.g., dirname2) ends and a concurrent document library name (e.g., docname) begins within a URL (e.g., /dirname1/dirname2/doclib/folder1/folder2/mydocument1.docx). Thus, in this example, the simple extractor 202 may be unable to extract the document library name. However, the heuristic data 206 may specify previous examples showing the directory name and/or the document library name. For example, the heuristic data 206 may indicate that "dirname1" and "dirname2" are known directory names and "doclib" is a known document library name. As a result, the heuristic extractor 210 can resolve the ambiguities in the URL by utilizing the heuristic data 206.

Upon generating the data file 204, the simple extractor 202 and/or the heuristic extractor 210 may provide the data file 204 to a web test generator 212. The web test generator 212 may retrieve a web test template 118. Upon retrieving the web test template 118, the web test generator 212 may also populate the web test template 118 with the data file 204 in order to generate the web test 120.

The data file 204 may be a text file, a CSV file, a binary file, or other suitable file type. The data file 204 may also be normalized when the data file 204 is too large. The data file 204 may be normalized in such a way that condenses the number of occurrences of the same data but maintains ratios between different types of data. For example, a data file containing 1,000 occurrences of a first data item and 2,000 occurrences of a second data item. This data file may be normalized to 100 occurrences of the first data item and 200 occurrences of the second data item, thereby maintaining the ratio between the first data item and the second data item.

Referring now to FIGS. 3A-3E, additional details regarding the operation of the simple extractor 202 will be provided according to various embodiments. In particular, FIGS. 3A-3E show example and illustrative XML codes that relate to the operation of the simple extractor 202. The XML code may provide functionality enabling the simple extractor 202 to extract relevant information for the data file 204 and/or generate the heuristic data 206. In other embodiments, this functionality may be embodied in other suitable file formats. The XML codes may be embodied in a single file or multiple files.

FIG. 3A shows an example and illustrative XML code of a match rule 300 that can be applied by the web traffic analysis tool 112. The match rule 300 may include a match rule name 302, a first condition 304, a second condition 306, and a third condition 308. In this example, the match rule 300 matches a given line of the log file 110 if attributes of the line satisfy the first condition 304, the second condition 306, and the third condition 308. The first condition 304 may be satisfied if the cs-uri-stem field of the line ends with "/default.aspx". The second condition 306 may be satisfied if the cs-uri-stem field of the line does not contain "/pages/". The third condition 308 may be satisfied if the cs-method field of the line equals "GET". If the line satisfies the first condition 304, the second condition 306, and the third condition 308, the web traffic analysis tool 112 may assign the match rule name 302 (i.e., "Match_ASPX_SiteHomePage") to the line, thereby identifying a type of request associated with the line. For purposes of illustration, it is assumed that the match rule 300 satisfies the line of the log file 110.

Figure 3C:
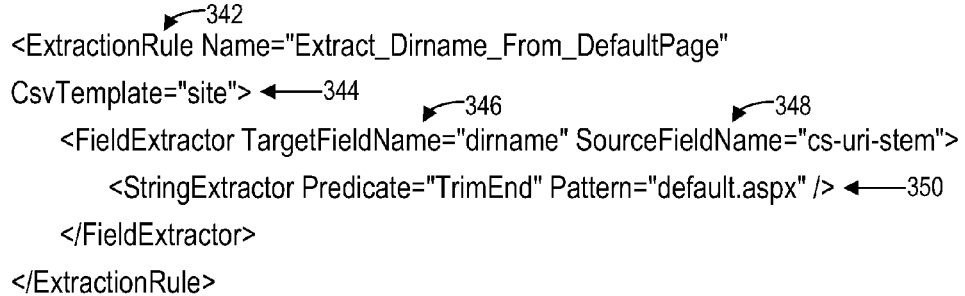
FIG. 3C shows an illustrative implementation of an extraction rule, in accordance with some embodiments.

FIG. 3B shows an example and illustrative XML code of a web test definition 320. The web test definition 320 may include a web test name 322, a match rule name 324, and an extraction rule name 326. When the web traffic analysis tool 112 applies the match rule 300 to the line and determines that the attributes of the line satisfy the match rule 300, the simple extractor 202 may be configured to identify one or more web tests that have registered the match rule 300. For example, the simple extractor 202 may identify that the web test definition 320 has registered the match rule 300 by matching the match rule name 324 of the web test definition 320 to the match rule name 302 of the match rule 300. Upon identifying that the web test definition 320 has registered the match rule 300, the simple extractor 202 may further identify an extraction rule corresponding to the extraction rule name 326 as specified in the web test definition 320. For example, the extraction rule name 326 specifies "Extract_Dirname_From_DefaultPage", which corresponds to an extraction rule 340 shown in FIG. 3C.

FIG. 3C shows an example and illustrative XML code of the extraction rule 340. The extraction rule 340 may include an extraction rule name 342, a template name 344, a target field name 346, a source field name 348, and an extraction operation 350. When the simple extractor 202 identifies the extraction rule name 326 in the web test definition 320, the simple extractor 202 may execute the corresponding extraction rule 340. That is, the extraction rule 340 contains the extraction rule name 342 that matches the extraction rule name 326 in the web test definition 320. The simple extractor 202 may retrieve information from the log file 110 as specified by source field name 348 and the extraction operation 350. The information may be stored in a web test template identified by the template name 344. In particular, the information may be stored in the target field identified by the target field name 346 within the web test template.

In this example illustrated in FIG. 3C, the source field name 348 may specify the cs-uri-stem field. The extraction operation 350 may specify a predicate "TrimEnd" and a pattern "default.aspx." In accordance with the source field name 348 and the extraction operation 350, the simple extractor 202 may retrieve a URL specified in the cs-uri-stem field and trim "default.aspx" from the end of the URL. Upon trimming the URL, the simple extractor 202 may then store the trimmed URL in the "dirname" target field within the "site" web test template, as indicated by the target field name 346 and the template name 344, respectively.

Figure 3D:
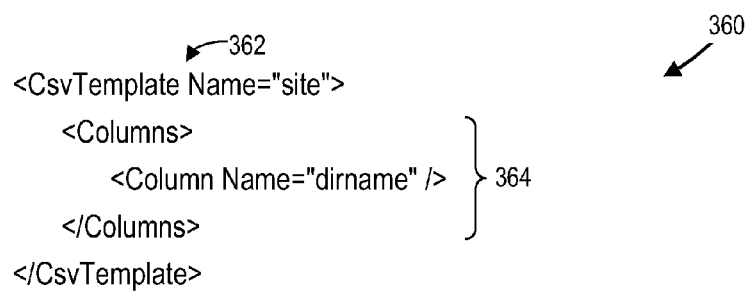
FIG. 3D shows an illustrative implementation of a web test template definition, in accordance with some embodiments.

FIG. 3D shows an example and illustrative XML code of a web test template definition 360. The web test template definition 360 may include a template name 362 and one or more columns, such as a column 364. In the example illustrated in FIG. 3D, the web test template definition 360 named "site" includes the column 364 called "dirname." Each entry (e.g., row) under the column 364 may correspond to a particular line within the log file 110.

Figure 3E:
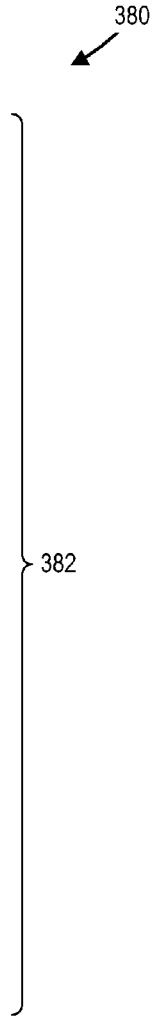
FIG. 3E shows an illustrative implementation of a heuristic data definition, in accordance with some embodiments.

FIG. 3E shows an example and illustrative XML code of a heuristic data definition 380. The heuristic data definition 380 may include one or more data sources 382. The simple extractor 202 may collect extracted data as specified by the data sources 382. This extracted data may become the heuristic data 206. As previously described, the heuristic extractor 210 may utilize the heuristic data 206 to resolve ambiguities in the log file 110 in order to extract relevant information from the log file 110.

Figure 4:
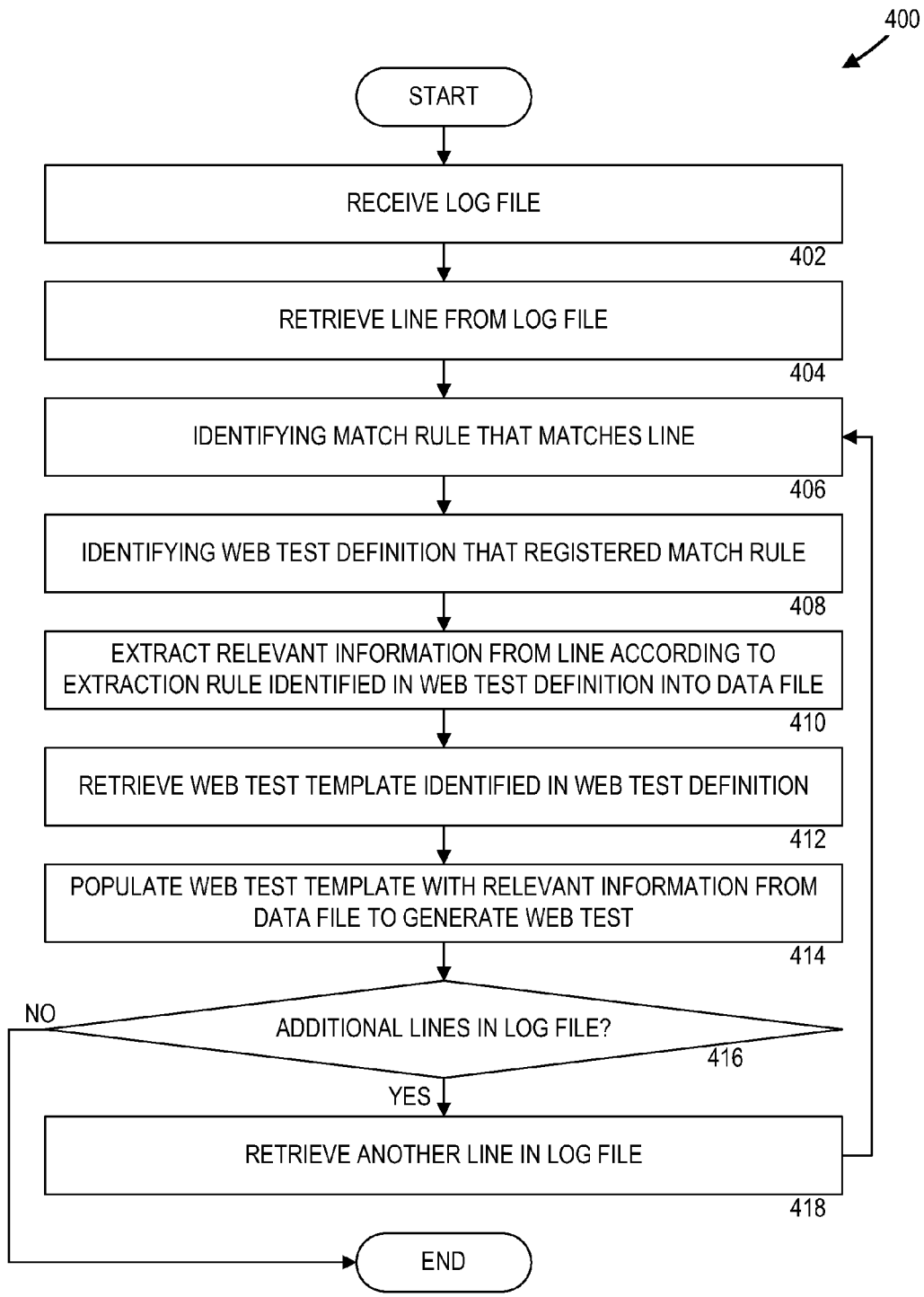
FIG. 4 is a flow diagram illustrating a method for generating a web test, in accordance with some embodiments.

Referring now to FIG. 4, additional details regarding the operation of the simply extractor 202. In particular, FIG. 4 is a flow diagram illustrating a method for generating a web test, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a routine 400 begins at operation 402, where the web traffic analysis tool 112 and/or the simple extractor 202 receive the log file 110. The log file 110 may include one or more lines, each of which corresponds to a request received at the web server 102. The routine 400 then proceeds to operation 404, where the web traffic analysis tool 112 retrieves a line from the log file 110. When the web traffic analysis tool 112 retrieves a line from the log file 110, the routine 400 proceeds to operation 406.

At operation 406, the web traffic analysis tool 112 identifies, from a sequence of match rules, a match rule, such as the match rule 300, that matches the line. Each match rule in the sequence of match rules may identify the type of request based on values of one or more attributes contained in the line. The web traffic analysis tool 112 may sequentially apply each match rule in the sequence of match rules according to a specified order. When the web traffic analysis tool 112 reaches a match rule that matches the line, the web traffic analysis tool 112 may identify the line with the type of request corresponding to the match rule and disregard the remainder of the match rules in the sequence of match rules. Until the web traffic analysis tool 112 reaches a rule that matches the line, the web traffic analysis tool 112 may continue to apply additional match rules in the sequence of match rules according to the specified order. When the web traffic analysis tool 112 identifies, from the sequence of match rules, a match rule that matches the line, the routine 400 proceeds to operation 408.

At operation 408, the simple extractor 202 identifies web test definition, such as the web test definition 320, that registered the identified match rule. The web test definition may contain a web test name, and the match rule may also contain a web test name. If the web test name in the web test definition matches the web test name in the match rule, then the web test definition may be considered to have registered the identified match rule. The web test definition may identify, among other information, an extraction rule and a web test template, such as the web test template 118. When the simple extractor 202 identifies web test definition that registered the identified match rule, the routine 400 proceeds to operation 410.

At operation 410, the simple extractor 202 extracts relevant information from the line according to the extraction rule identified in the web test definition. For example, the extraction rule may specify the relevant information to be extracted from the line. The relevant information may be deemed "relevant" because it is utilized to generate the web test 120. The simple extractor 202 may store the relevant information in the data file 204. When the simple extractor 202 extracts relevant information from the line according to the extraction rule identified in the web test definition, the routine 400 proceeds to operation 412.

At operation 412, the web test generator 212 retrieves the web test template that is identified in the web test definition. The routine 400 then proceeds to operation 414, where the web test generator 212 populates the web test template with the extracted relevant information to generate the web test 120. For example, the web test generation tool 116 may populate the empty variables in the web test template with the relevant information. When the web test generator 212 populates the web test template with the extracted relevant information to generate the web test 120, the routine 400 proceeds to operation 416.

At operation 416, the web traffic analysis tool 112 determines whether any lines in the log file 110 have yet to be evaluated. If the web traffic analysis tool 122 determines that at least one line in the log file 110 has yet to be evaluated, the routine 400 proceeds to operation 418, where the web traffic analysis tool 112 retrieves another unevaluated line in the log file 110. The routine 400 then proceeds back to operation 406. Operations 406-418 may be repeated until each of the lines in the log file 110 have been evaluated. If the web traffic analysis tool 122 determines that each of the lines in the log file 110 has been evaluated, the routine 400 ends.

Figure 5:
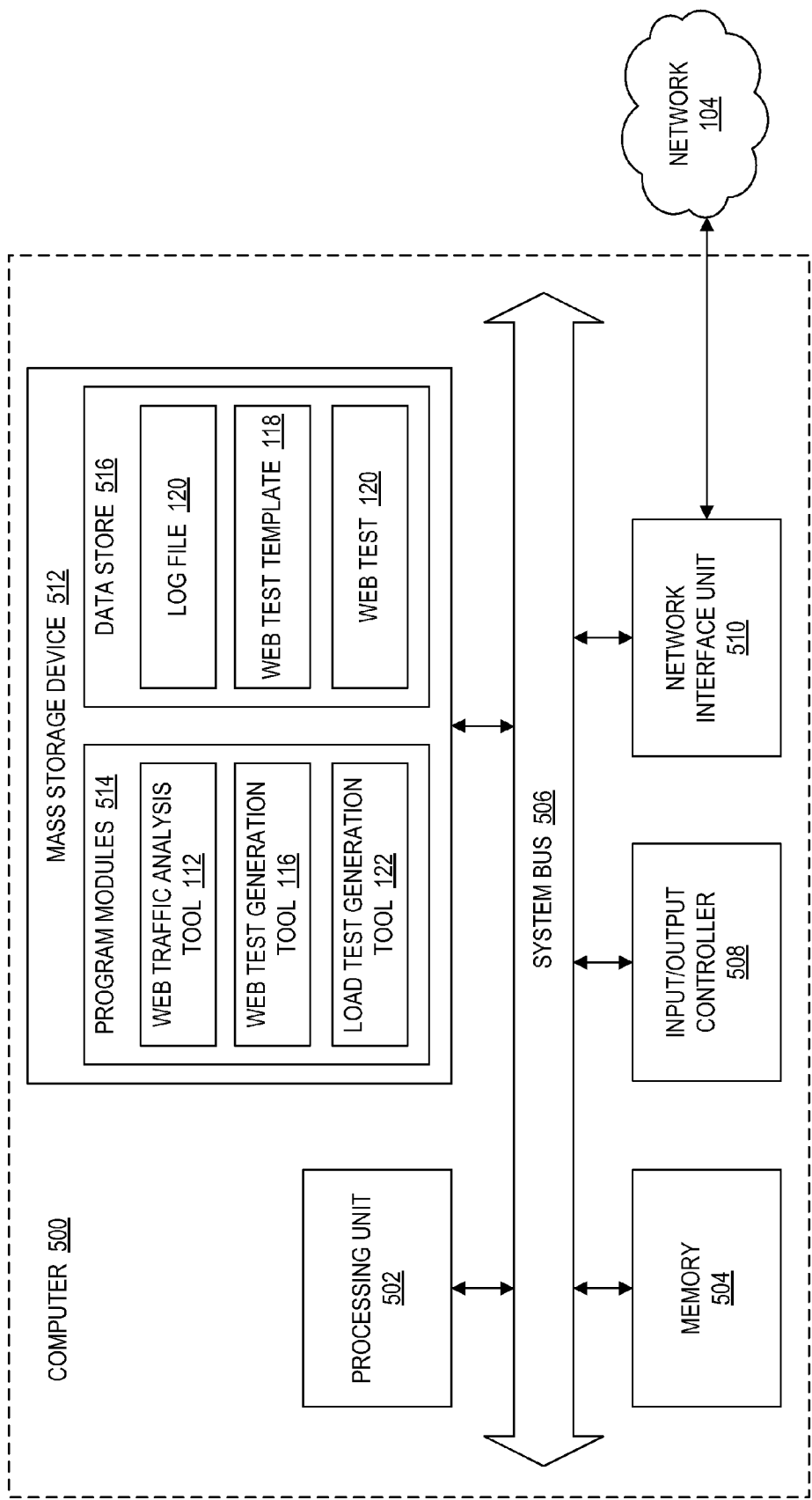
FIG. 5 is a computer architecture diagram showing an illustrative computer hardware architecture for a computing system capable of implementing the embodiments presented herein.

Turning now to FIG. 5, an example computer architecture diagram showing a computer 500 is illustrated. Examples of the computer 500 may include the web server 102 and the client computer 106. The computer 500 may include a central processing unit 502, a system memory 504, and a system bus 506 that couples the memory 504 to the 502. The computer 500 may further include a mass storage device 512 for storing one or more program modules 514 and a data store 516. Examples of the program modules 514 may include the web traffic analysis tool 112, the web test generation tool 116, and the load test generation tool 122. The data store 516 may store the log file 120, the web test template 118, the web test 120, and/or other data. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 104. The computer 500 may connect to the network 104 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to generate a web test. The program modules 514 may also provide various tools or techniques by which the computer 500 may participate within the overall systems or operating environments using the components, flows, and data structures discussed throughout this description. For example, the program modules 514 may implement interfaces for generating a web test.

In general, the program modules 514 may, when loaded into the processing unit 502 and executed, transform the processing unit 502 and the overall computer 500 from a general-purpose computing system into a special-purpose computing system customized to generate a web test. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for generating a web test are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for generating a web test, the method comprising computer-implemented instructions for:
   receiving a log file containing one or more requests received at a web server;
   extracting relevant information from the log file into a data file by
      retrieving a line from the log file;
      determining whether the line matches a match rule that identifies a type of request based on values of one or more attributes contained in each line;
      in response to determining that the line matches the match rule, identifying a web test definition that registered the match rule, the web test definition identifying an extraction rule and the web test template;
   retrieving a web test template;
   determining whether the relevant information can be extracted from the line according to the extraction rule;
   in response to determining that the relevant information can be extracted from the line according to the extraction rule, extracting the relevant information from the line according to the extraction rule; and
   populating the web test template with the relevant information from the data file to generate the web test.

2. The computer-implemented method of claim 1, further comprising computer-implemented operations for:
   in response to determining that the relevant information cannot be extracted from the line according to the extraction rule, retrieving heuristic data; and
   utilizing the heuristic data to extract the relevant information from the line according to the extraction rule.

3. The computer-implemented method of claim 2, wherein the heuristic data comprises previous relevant information extracted from previous lines.

4. The computer-implemented method of claim 1, wherein the match rule comprises a first match rule name; wherein the web test definition comprises a second match rule name; and wherein identifying a web test definition that registered the match rule comprises identifying the web test definition having the second match rule name equal to the first match rule name.

5. The computer-implemented method of claim 1, wherein the web test template comprises a static component having one or more predefined values and a dynamic component having one or more empty variables; and wherein populating the empty variables with the relevant information from the data file to generate the web test comprises populating the empty variables with the relevant information from the data file to generate the web test.

6. The computer-implemented method of claim 1, further comprising computer-implemented operations for combining the web test and other web tests to generate a load test.

7. The computer-implemented method of claim 6, wherein the load test comprises parameters for executing the web test and the other web tests.

8. The computer-implemented method of claim 7, wherein the parameters comprise counts or percentages in which the web test and the other web tests are executed or a number of users accessing the web server.

9. The computer-implemented method of claim 1, wherein extracting relevant information from the log file into a data file comprises extracting a uniform resource locator (URL), user information, or file information from the log file.

10. The computer-implemented method of claim 1, further comprising computer-implemented operations for normalizing the data file to condense a number of occurrences of similar data while maintaining ratios between different types of data.

11. A computer system, comprising:
   a processor;
   a memory communicatively coupled to the processor; and
   a program module which (i) executes in the processor from the memory and (ii) which, when executed by the processor, causes the computer system to generate a web test by
      receiving a log file comprising one or more lines, each of the lines corresponding to a request received at a web server, retrieving a line from the log file, identifying a match rule that identifies a type of request based on values of one or more attributes contained in each line that matches the line, upon identifying a match rule that matches the line, identifying a web test definition that registered the match rule, the web test definition identifying an extraction rule and a web test template, determining whether the relevant information can be extracted from the line according to the extraction rule, in response to determining that the relevant information can be extracted from the line according to the extraction rule, extracting relevant information from the line according to the extraction rule into a data file by determining whether the relevant information contains an ambiguity, if the relevant information does not contain an ambiguity, extracting the relevant information from the line according to the extraction rule, if the relevant information does contain an ambiguity, retrieving heuristic data, and, utilizing the heuristic data to extract the relevant information from the line according to the extraction rule, retrieving the web test template, and populating the web test template with the relevant information from the data file to generate the web test.

12. The computer system of claim 11, wherein the heuristic data comprises previous relevant information extracted from the previous lines; wherein the match rule comprises a first match rule name; wherein the web test definition comprises a second match rule name; and wherein identifying a web test definition that registered the match rule comprises identifying the web test definition having the second match rule name equal to the first match rule name.

13. The computer system of claim 11, wherein the web test template comprises a static component having one or more predefined variables and a dynamic component having one or more empty variables; and wherein populating the web test template with the relevant information to generate the web test comprises populating the empty variables with the relevant information to generate the web test.

14. The computer system of claim 11, further comprising computer-implemented operations for combining the web test and other web tests to generate a load test, the load test comprising parameters for executing the web test and the other web tests, the parameters comprising counts or percentages in which the web test and the other web tests are executed or a number of users accessing the web server.

15. The computer system of claim 11, wherein extracting relevant information from the log file into a data file comprises extracting a uniform resource locator (URL), user information, or file information from the log file.

16. The computer system of claim 11, further comprising computer-implemented operations for normalizing the data file to condense a number of occurrences of similar data while maintaining ratios between different types of data.

17. A computer-readable storage medium having computer-executable instructions stored thereon which, when executed by a computer, cause the computer to:

receive a log file comprising one or more lines, each of the lines corresponding to a request received at a web server;

retrieve a line from the log file;

identify a match rule that identifies a type of request based on values of one or more attributes contained in each line that matches the line;

upon identifying a match rule that matches the line, identify a web test definition that registered the match rule, the web test definition identifying an extraction rule and a web test template;

determine whether the relevant information can be extracted from the line according to the extraction rule by determining whether the relevant information contains an ambiguity;

in response to determining that the relevant information does not contain an ambiguity, extract the relevant information from the line according to the extraction rule into a data file;

in response to determining that the relevant information contains an ambiguity, retrieve heuristic data;

upon retrieving the heuristic data, utilize the heuristic data to extract the relevant information from the line according to the extraction rule;

retrieve the web test template; and populate the web test template with the relevant information from the data file to generate a web test.

* * * * *